No. 652,471. Patented June 26, 1900.
A. J. CHASE.
STORAGE AND SHIPPING DEVICE FOR LIQUID AIR.
(Application filed Aug. 7, 1899.)
(No Model.)

Witnesses:
Thomas Drummond,
Edward F. Allen.

Inventor,
Andrew J. Chase.
by Crosby Gregory
attys.

UNITED STATES PATENT OFFICE.

ANDREW J. CHASE, OF BOSTON, MASSACHUSETTS.

STORAGE AND SHIPPING DEVICE FOR LIQUID AIR.

SPECIFICATION forming part of Letters Patent No. 652,471, dated June 26, 1900.

Application filed August 7, 1899. Serial No. 726,374. (No model.)

*To all whom it may concern:*

Be it known that I, ANDREW J. CHASE, of Boston, county of Suffolk, State of Massachusetts, have invented an Improvement in Storage and Shipping Devices for Liquid Air, of which the following description, in connection with the accompanying drawings, is a specification, like letters and figures on the drawings representing like parts.

This invention relates to a storage and shipping device for liquid air.

My device includes as one of its essential features a liquid-air container and means for directing a fluid at a higher temperature than the liquid air against said container, and in the present instance I prefer to control the supply of the fluid by hand, whereby its quantity can be properly regulated. In the embodiment of the invention illustrated in the accompanying drawings I inclose the liquid-air container in a receptacle and separate the two parts by heat-insulating means, thereby thoroughly to protect the liquid air from heat as far as possible. The fluid employed to act against the liquid-air container may be of any suitable kind; but I prefer to utilize atmospheric air for this purpose, and it is preferably admitted to an air chamber or tank placed beneath the liquid-air container and in adjacence thereto. This air-chamber communicates with the atmosphere through a suitable system of piping, and upon the admission of atmospheric air thereinto it acts against the liquid-air container, thereby causing the liquid air to boil or expand, whereby the liquid air can be withdrawn from its container for use by the mere expansion or boiling of the same. The device constructed as thus set forth may be shipped from place to place, and the contents of the liquid-air container during transit will be thoroughly protected by the heat-insulating jacketing surrounding the container. It will be evident that the device as a whole can be supported in a suitable place and that as much of the contents as may be necessary in a particular case may be drawn off simply by the admission of air to the air-chamber, the quantity drawn off depending, of course, upon the temperature of the atmospheric air and the length of time it acts against the liquid-air container.

Figure 1:
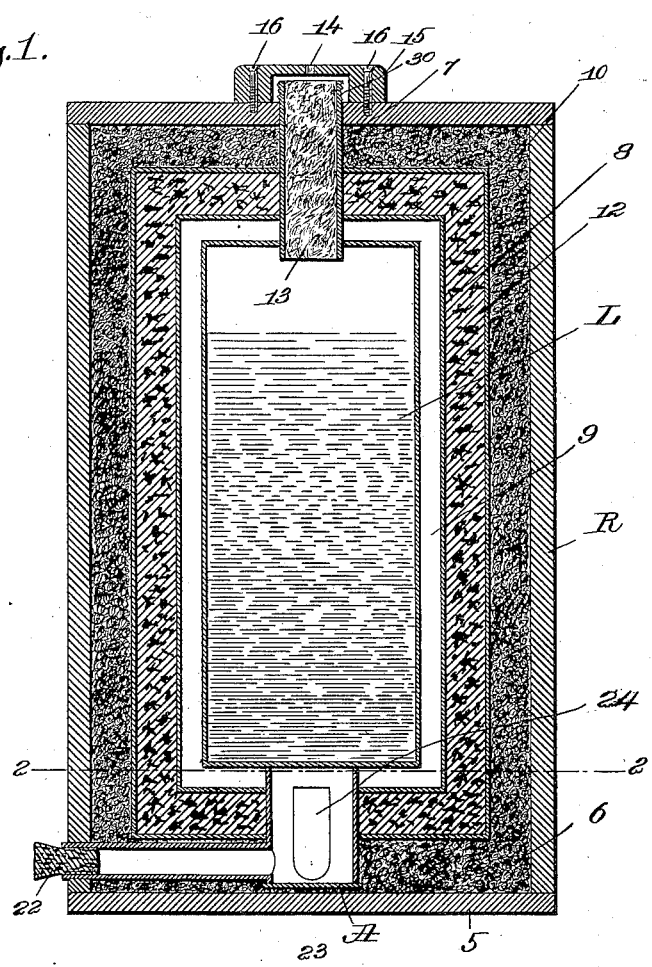
Figure 2:
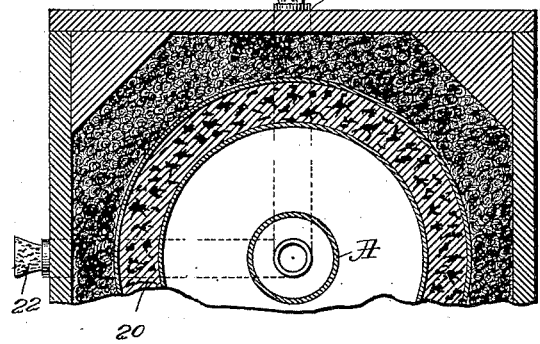

In the drawings, Figure 1 is a longitudinal central section of a liquid-air storage and shipping device constructed in accordance with my invention and showing the same in the preferred embodiment thereof. Fig. 2 is a sectional plan view, the section being taken in the line 2 2, Fig. 1.

The device constituting my invention includes in its organization a liquid-air container, which may be of any suitable kind capable of holding the liquid and of resisting the effects of the same. It is ordinarily formed from copper.

The liquid-container illustrated is denoted by L, and it is represented as being of cylindrical shape, and it is inclosed within the receptacle R, which I prefer to make of wood for convenience in shipment, and the two parts are separated by heat-insulating means of suitable character, such means in the form of invention illustrated including one or more jackets of non-conductors of heat and a vacuum-space, so as to prevent as far as possible the action of atmospheric air against the liquid-container, except of course when the air is admitted to effect the withdrawal of a certain amount of the liquid. The container rests upon and is secured to the air-chamber A, hereinafter more particularly described, which in turn is surrounded by the jacketing and which is separated from the bottom 5 of the receptacle R by the filling or jacketing 6, of finely-divided or comminuted cork or similar material. The air-chamber A is open upon its upper side, (shown in Fig. 1,) so that the air therein can act directly against the bottom of the liquid container or tank L to cause the contents to boil, thereby to effect the withdrawal thereof. The upper end or head of the cylindrical liquid-container is adapted to receive the discharge pipe or tube 7, which passes centrally through the same and which extends likewise through the jackets surrounding said container and also through the top or cover of the receptacle or box R.

The liquid-container L is surrounded by the cylindrical casing 8 and is separated therefrom by a vacuum-space 9, the air being drawn off between the two parts in some suitable manner, (not shown,) and the heads or ends of the cylinder or casing 8 have central openings to receive the vertically-disposed air-chamber A and the vertically-disposed discharge pipe or tube 7, respectively. The casing or cylinder 8 is surrounded by a second casing or cylinder 10, both of them being formed of suitable material and being separated by a space of proper extent, which is adapted to receive a heat-insulator or jacketing, as 12, which may be of any convenient nature. The jacketing 12 may consist of carbonate of magnesia, and it fills or is closely packed in the space between the two casings or shells. The outermost casing 10 is separated from the walls of the receptacle R by a space of comparatively-considerable area, which is closely packed with finely-ground cork or any other good heat-insulating substance. The several parts L, 8, 10, 7, and A may be connected by solder joints or otherwise, as may be desired.

Ordinarily I prefer to fill the discharge-tube 7 with some fibrous or porous material, as 13, extending from end to end thereof, which allows the escape of expanding gas through the same and also through the vent or escape opening 14 in the cap 15, which fits over the upper end of the tube 7 and which is secured to the receptacle or box R by screws 16 or equivalent means. By the removal of the cap 15 access may be readily had to the interior of the liquid-container L, so that one leg or branch of a siphon can be inserted in the discharge-tube. The filling of fibrous material in the discharge-tube is in the nature of a safety-valve. When any unusual pressure arises in the liquid-container, the fibrous substance will be at once blown out or expelled, thereby preventing explosions, and it also serves to prevent the entrance of dust, dirt, or other foreign matter into the container. Upon the admission of fluid to the chamber A—and the fluid admitted consists in the present case of air, although of course this is not essential—the contents of the liquid-container will be caused to boil and expand, provided, of course, the fluid admitted is of a higher temperature than the liquid air and this of course will be the case when atmospheric air is employed. To remove any part of the contents of the liquid-container L, the cap-piece 15 will be detached and the fibrous filling 13 removed from the discharge-tube 7, after which a leg of a siphon can be introduced through the tube 13 and into the tank or container L, and upon the action by the boiling fluid against the tank the contents thereof can be expelled through the siphon for use. This is one method of drawing off the contents of the liquid-container, and the amount removed will be governed by the temperature of the fluid acting against the container and necessarily the duration of time. It will be understood, therefore, that any amount of the liquid air can be removed for refrigerating or other purposes without the necessity of tipping or tilting the device or the liquid-container, as in such a case as this the atmospheric air could easily reach the liquid air and cause the rapid boiling and consequent waste of the same. The means for directing the fluid against the liquid-container are under the control of the user, so that the discharge of the liquid air for use can be regulated with nicety and without the waste which usually follows.

Two fluid-supply tubes are represented at 20 and 21, and they lead into the fluid-container or supply-chamber A, which, it will be remembered, is located underneath the liquid container or tank L. These tubes or pipes, it will be seen upon inspection of Fig. 2, are disposed at right angles to each other, and they extend through the cork filling 6 and also through and a short distance beyond the outer or main receptacle R, and the outer ends thereof are covered by suitable closures or stoppers, which when in place serve to prevent the admission of fluid or air to the chamber A. The closures illustrated consist of corks 22 and 23, which are normally snugly fitted into the outer end of the two pipes. By removing these stoppers air or other fluid can be admitted into the chamber A, and thereby directed against the under side of the liquid-container L to boil the contents there. The inner end of the pipe 21 extends into the chamber A and has a bend or elbow 24 therein, the delivery end of the pipe 21 therefore being quite close to the under side of the liquid-container L. The cold air will be allowed to flow out of the air-chamber A by removing the stopper 22 at the outer end of the tube, and afterward the stopper 23 can be removed, and thus permit the admission of the atmospheric air, which can strike the under side of the tank L in the manner previously described. When sufficient expansion of the liquid air has been attained, the two stoppers will be reinserted. In some cases the upper end of the discharge-tube 7 can be screw-threaded, as at 30, to receive a coupling to unite it to a suitable device, whereby the latter can be charged with cold air from the liquid-container by the removal of the two stoppers.

The invention of course is not limited to the precise details hereinbefore set forth, for, as the present invention is a broad one, these may be variously modified within the scope of the appended claims. For example, while air is a convenient medium for acting against the liquid-air tank it is obvious, of course, that any other fluids may be employed to equal advantage. For instance, water could be admitted to effect the desired results.

Having described my invention, what I claim, and desire to secure by Letters Patent, is—

1. A storage and shipping device for liquid air, comprising a heat-resistant jacketed liquid-air container, a chamber located outside of said liquid-air container in proximity thereto and inclosed by the jacketing, and means for admitting fluid to such chamber and controlling the quantity supplied.

2. A storage and shipping device for liquid air, comprising a heat-resistant jacketed liquid-air container, a chamber located outside of said liquid-air container in proximity thereto and inclosed by the jacketing, means for admitting fluid to such chamber and controlling the quantity supplied, and a discharge-pipe connected with the top of said liquid-air container.

3. A storage and shipping device for liquid air, comprising a heat-resistant jacketed liquid-air container, a chamber separate from and located outside and in proximity to the container and inclosed by the jacketing, and two pipes communicating with said chamber, and the delivery end of one of them being located above the delivery end of the other, and means for controlling the flow of a fluid through said pipes.

4. A device of the class specified, comprising a heat-resistant jacketed liquid-air container; a chamber separate from and located below the container and inclosed by the jacketing; and means for admitting fluid to such chamber and controlling the quantity supplied.

5. A storage and shipping device for liquid air, comprising a heat-resistant jacketed liquid-air container, a chamber separate from and in proximity to the container and inclosed by the jacketing, a discharge-pipe containing fibrous material and communicating with the liquid-air container, and means for admitting fluid to said chamber and controlling the quantity supplied.

In testimony whereof I have signed my name to this specification in the presence of two subscribing witnesses.

ANDREW J. CHASE.

Witnesses:
HEATH SUTHERLAND,
JOHN C. EDWARDS.